(12) United States Patent
Maes et al.

(10) Patent No.: US 6,442,251 B1
(45) Date of Patent: Aug. 27, 2002

(54) METHOD AND APPARATUS FOR TAKING A NOTE WHILE IN A CALL

(75) Inventors: Stephane Maes, Mountain View; Tim Twerdahl, Los Altos, both of CA (US); Benoit Vialle, Evanston, IL (US); Ryan Robertson, Seattle, WA (US)

(73) Assignee: Palm Incorporated, Santa Clara, CA (US)

(*) Notice: Subject to any disclaimer, the term of this patent is extended or adjusted under 35 U.S.C. 154(b) by 1 day.

(21) Appl. No.: 09/675,363

(22) Filed: Sep. 29, 2000

(51) Int. Cl.[7] .............................................. H04M 11/00
(52) U.S. Cl. ................. 379/93.23; 379/110.01
(58) Field of Search ........................... 379/93.17–93.19, 379/93.23–93.27, 110.01, 354–355.07, 356.01, 357.03–357.05

(56) References Cited

U.S. PATENT DOCUMENTS

| | | | | |
|---|---|---|---|---|
| 4,763,356 A | * | 8/1988 | Day et al. ................. | 379/93.19 |
| 4,924,496 A | * | 5/1990 | Figa et al. ............. | 379/355.06 |
| 5,065,309 A | * | 11/1991 | Putnam et al. ......... | 379/110.01 |
| 6,249,579 B1 | * | 6/2001 | Bushnell ................ | 379/356.01 |
| 6,252,948 B1 | * | 6/2001 | Okamoto ................ | 379/93.23 |

* cited by examiner

*Primary Examiner*—Wing F. Chan
(74) *Attorney, Agent, or Firm*—Crosby, Heafey, Roach & May; John W. Carpenter

(57) ABSTRACT

A phone application includes a note button. During a call, when the note button is pressed, a note entry screen is presented to a user. The note entry screen is pre-populated with information already known about the phone call (number of caller, number dialed, name of caller, name of person called, etc.). The know information is retrieved from network data, including phone number and caller id for incoming calls, and the number dialed for outgoing calls, each in conjunction with the user's address book. The user completes the note entry screen including any notes the user wishes to make regarding the phone call. Upon completion of the note, if an address book entry has not been made or is incomplete, an address book entry screen is presented to the user to make or complete an entry for the caller/person called. The phone application runs on a PDA having telephone capabilities.

27 Claims, 11 Drawing Sheets

900-A — Call: July 14, 2000  2:09pm  — 905
- Unnamed -
900-B

Done   Delete...
530    540

Fig. 9

Address Edit                          Unfiled — 1040

1000 — Last name:
1002 — First name:
1004 — Title:
1008 — Company:
1010 — ▼ Work:  408 326 9946
1030
1012 — ▼ Home:
1014 — ▼ Fax:
1016 — ▼ Other:
1018 — ▼ E-mail:
1020 — Address:

Done   Delete...   Note   ↑ ⇕
1080   1070       1060   1055 1050

Fig. 10

- Unnamed - — 1305
1310-A — Call: July 14, 2000  2:09pm
1310-B

Done  Delete...
530    540

Fig. 13

Address Edit                        Unfiled
Last name:
First name:
Title:
Company:
▼ Work:
▼ Home:
▼ Fax:
▼ Other:
▼ E-mail:
Address:

Done  Delete...  Note  ↑ ↕

Fig. 14

METHOD AND APPARATUS FOR TAKING A NOTE WHILE IN A CALL

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

This invention relates generally to note taking systems. The invention is more specifically related to a note taking systems utilized noting telephone calls.

2. Discussion of Background

Personal computer systems and their applications have become common tools in modern society. To organize their lives, many personal computer users use personal information management applications such as an address book and a daily organizer on their personal computers. Although such applications have proven useful for personal information management, their utility is limited by the fact that the person must be sitting at their personal computer system to access the information.

To remedy this limitation, palmtop computers, electronic organizers and other handheld devices, commonly known as personal digital assistants (PDA's), have been introduced. The PDA is a computer that is small enough to handheld or placed in a pocket, and allows a user to run various applications including personal information management applications such as address books, daily organizers, etc. These applications make people's lives easier.

The most popular brand of PDA is the Palm™. However, the Palm™ is much more than a simple PDA. A basic configuration of the Palm™ 100 is shown in FIG. 1. This small, slim, device, about the size of your wallet, can hold 6000 addresses, 5 years of appointments, 1500 to-do items, 1500 memos, 200 e-mail messages, and can run many different software applications.

The front of the Palm™ 100 is a large LCD screen 110 which is touch-sensitive and allows a user to enter and manipulate data. A stylus (not shown) is provided with the Palm™ to help in making touch screen inputs. By using the stylus (or another handheld pointer) to interact with a touch-sensitive screen, a palmtop user can easily navigate through a host of built-in programs, software, and other applications.

Today, the Palm™, PDA and other handheld computing devices offer Internet connectivity capabilities, as well as a vast array of hardware and software choices. Palmtops have evolved from simple organizers into a new kind of handheld device that people use to instantly manage all kinds of information, from email, to medical data, to stock reports.

However, despite the great capabilities and conveniences of the modern PDA, many innovations are needed for expanding the capabilities and for increasing the convenience of using PDAs is needed.

SUMMARY OF THE INVENTION

The present inventors have realized that a Palm™ type computer is ideal platform for taking notes during a phone call. A call note button is provided that a user can tap while in a phone call, which activates an application for taking a note. The note is pre-populated with items such as the telephone number the user called (or the number that called the user), a name associated with the number called, a time stamp, and/or other information available to the note taking portion (or subprogram) of the address book application. A screen is provided having a note entry area where the user can enter information about the phone call to complete the note.

Upon exiting the note, the note taking application provides the capability for updates to the user's address book based on information collected about the call. Information for updating the address book may be collected from the note, caller id information, additional information entered by the user (the number called, for example), or other sources.

The present invention is embodied as an electronic device, comprising, a phone application configured to allow a user to place and receive telephone calls, a note button, and a note device that operates upon activation of the note button, wherein the note device is configured to take a note during a telephone call.

The present invention includes a method of operating a PDA, comprising the steps of, receiving a note signal from a user during a telephone call, opening a note entry screen having at least one field for placement of data about the phone call, and a user modifiable note field, and pre-populating at least one of the data fields with information regarding the telephone call.

The present invention may also be embodied on a computer readable media having instructions stored thereon, the instructions, when loaded into and executed by a computer or processing device, perform the steps of, receiving a note signal, opening a note entry screen having, at least one field for placement of data about a telephone call placed or received by a user, and a user modifiable note field, pre-populating at least one of the data fields with information regarding the telephone call.

Both the device and method may be conveniently implemented using general purpose programming and executed on a computer, such as a modern PDA, Palm™, or networked computers, and the results may be displayed on an output device connected to any of the general purpose, PDA, Palm™, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 9 is a screen shot of an embodiment of the note entry screen for an identified number without an address book entry;

FIG. 10 is a screen shot of an embodiment of an address book entry being populated for an identified number according to the present invention;

FIG. 13 is a screen shot of an embodiment of the note entry screen according to the present invention for a network unidentified call; and FIG. 14 is a screen shot of an address book edit screen according to an embodiment of the present invention for a network unidentified call.

DESCRIPTION OF THE PREFERRED EMBODIMENTS

Figure 1:
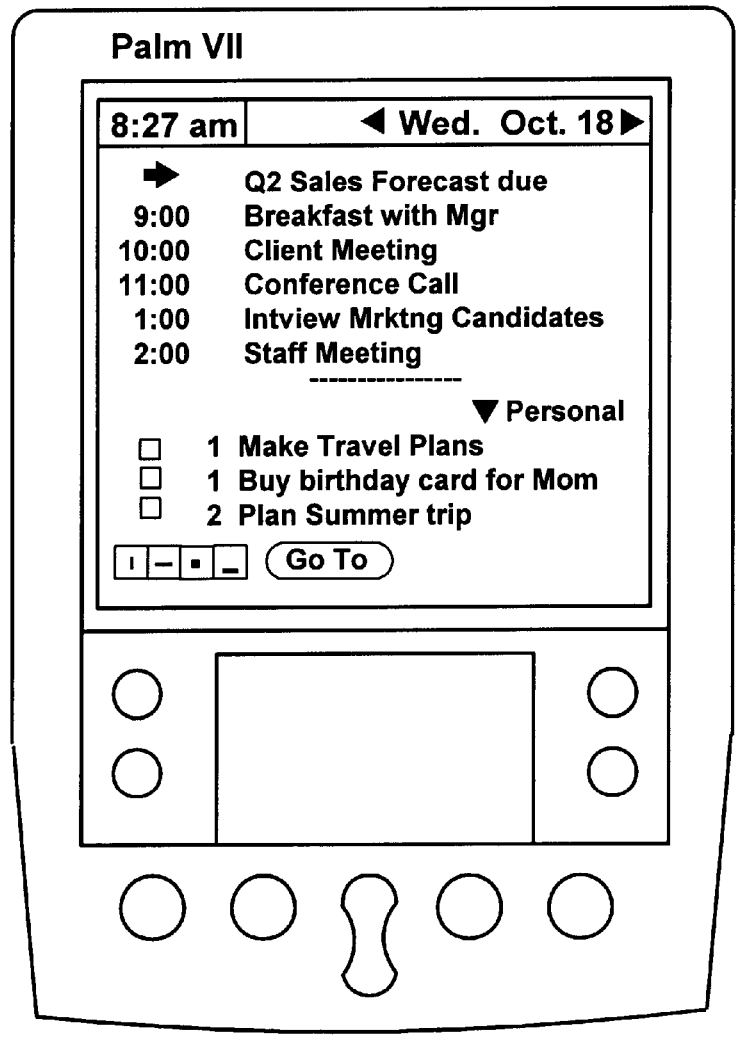
FIG. 1 is a graphic of a Palm™.
Figure 2:
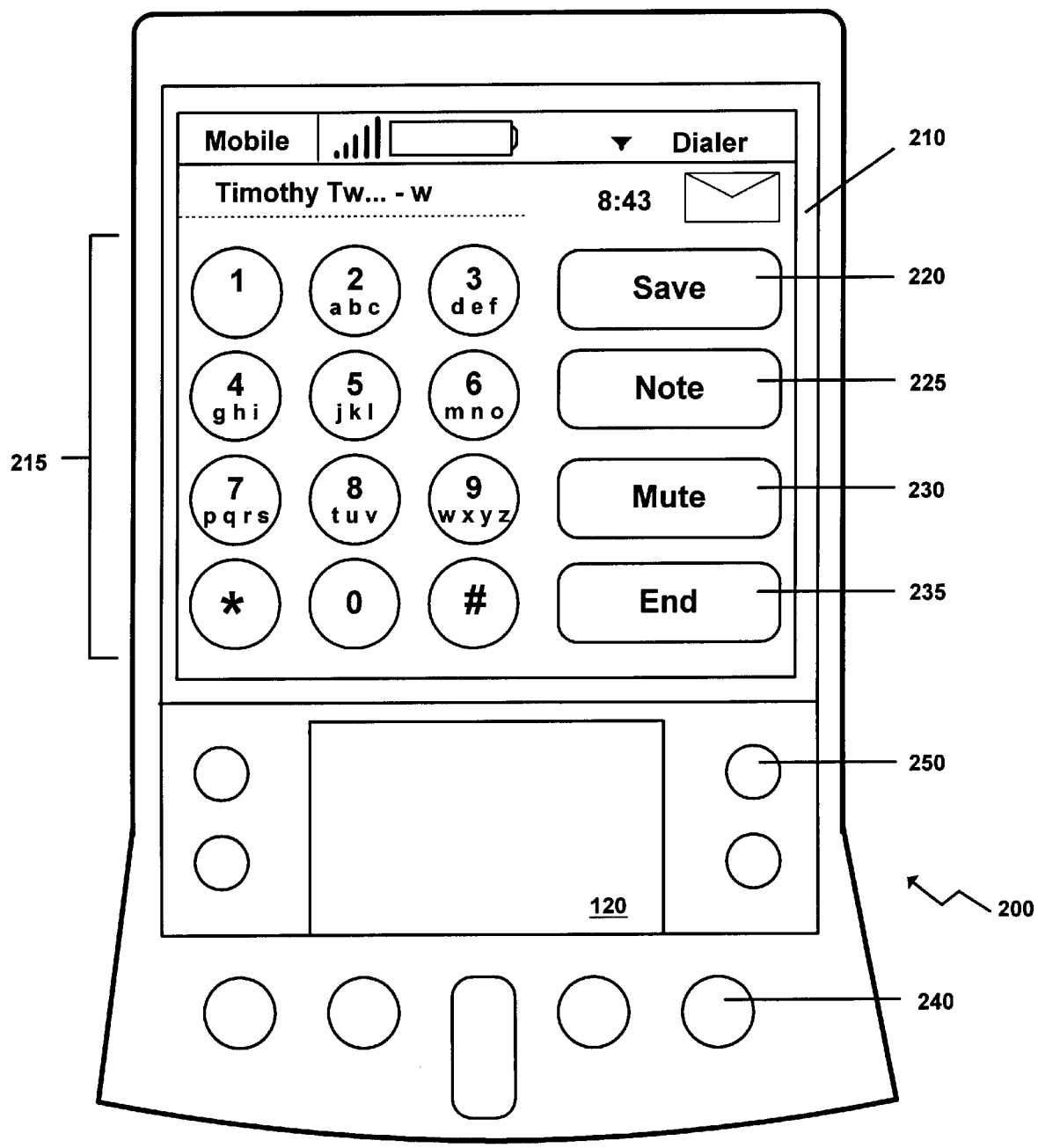
FIG. 2 is an illustration of a Palm™ handheld computer running a phone application according to one embodiment of the present invention.

Referring again to the drawings, wherein like reference numerals designate identical or corresponding parts, and more particularly to FIG. 2 thereof, there is illustrated a Palm™ handheld computer 200 running a phone application 210 according to one embodiment of the present invention. Although the Palm™ is used to illustrate the various aspects of the invention, it should be understood that the invention as described herein may also be practiced on other devices, including other Palm™ models, PDA'S, computer devices, PC's, notebooks, etc.

As shown in FIG. 2, the phone application 210 includes a dialer screen 215 that includes keypad digits 1–9, *, and #, and a set of operation keys. The operation keys include Save 220, Note 225, Mute 230, and End 235. User activation of the Save key saves the phone number associated with a call the user is currently engaged to the address book. User activation of the Mute key 230 mutes the caller at the other end of the line (other caller), which keeps the other caller from hearing any conversation initiated at the users side of the conversation. User activation of the End key 235 terminates the call that the user is currently participating. Other functions may be assigned or programmed into the keys, and additional or alternative keys and functions may also be provided.

Figure 15:
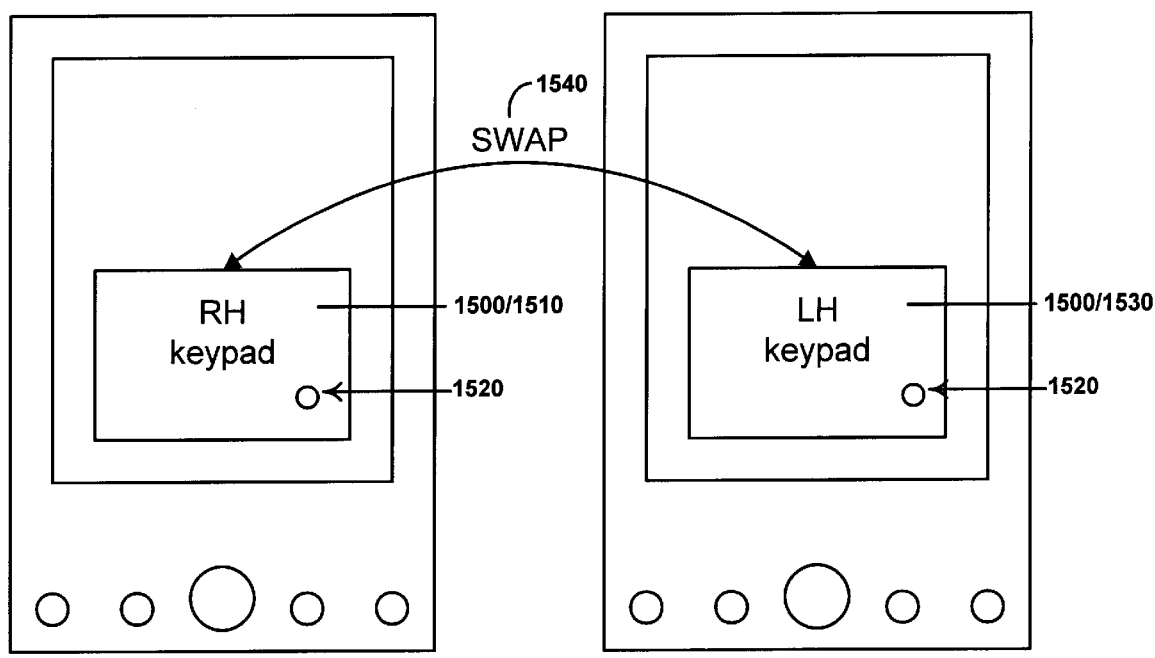
FIG. 15 is a block diagram of a reconfiguration of keys of a dialing mechanism according to an embodiment of the present invention.

In one embodiment, a dialing mechanism includes an input that reconfigures the arrangement of keys and buttons of the dialing mechanism. For example, the reconfiguration may include swapping locations of the buttons and keypad between each of configurations preferred for right hand and left hand operations. FIG. 15 provides an example dialing mechanism 1500 with of an arrangement of keys 1510 configured for left hand operations, and an input 1520 for reconfiguring the keys. The input 1520 initiates a swap 1540 from the left hand configuration 1510 to a right hand configuration 1530.

While on a call, the Note key 225 activates an in-call note taking service, allowing the user to take notes about the call and return to the dialer screen for control of other telephone options after completing the note.

Figure 3:
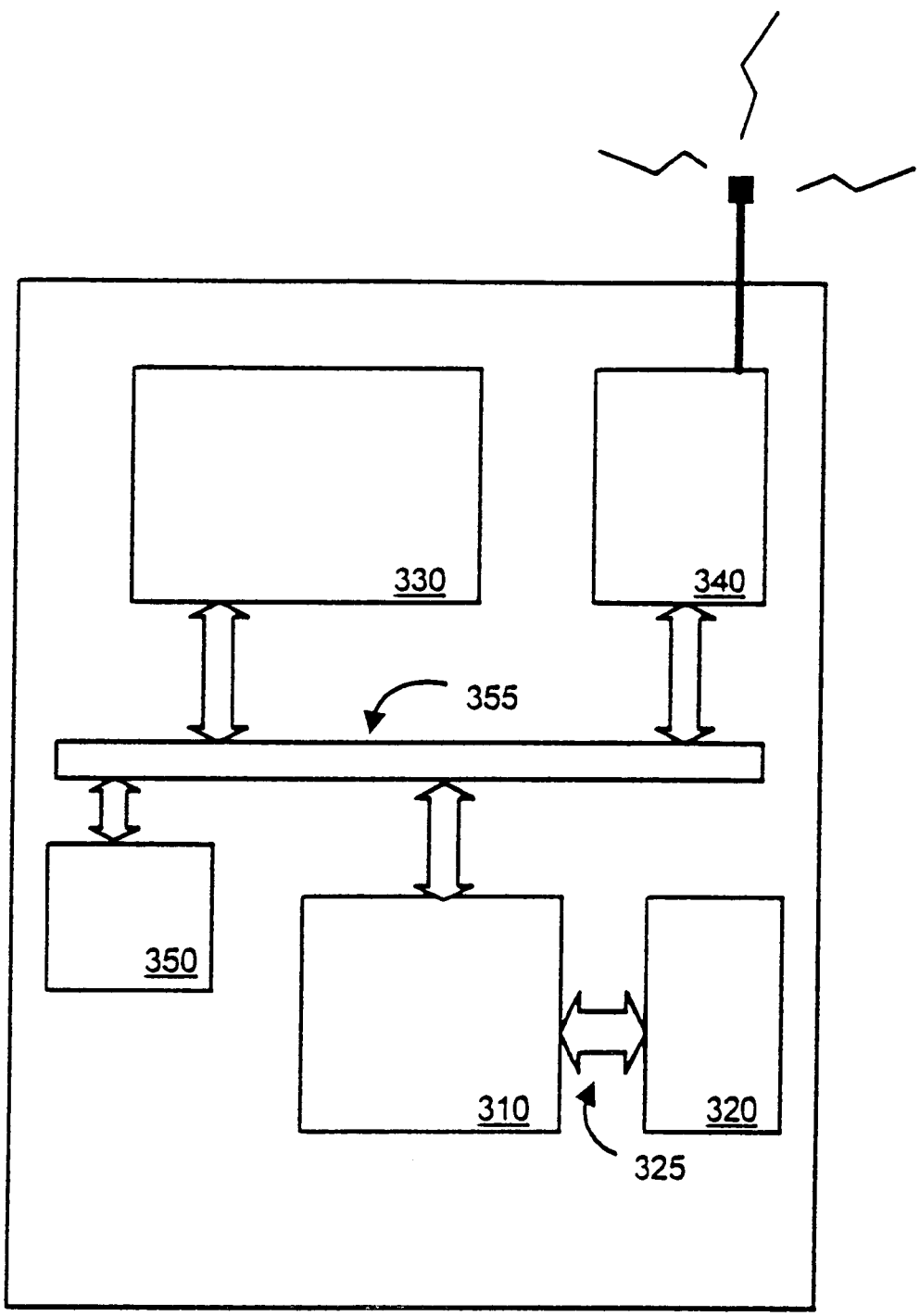
FIG. 3 is a block diagram of selected internal components of a Palm™ 200 according to an embodiment of the present invention.

FIG. 3 is a block diagram of selected internal components of a Palm™ 200 according to an embodiment of the present invention. The selected components include a Processing Unit 310, memory device 320 and memory bus 325. The processing unit accesses and runs programs stored in the memory device 320, including the phone application and its subprograms. The subprograms utilized by the Phone application include a subprogram for the dialer screen and dialer screen related operations, a subprogram for taking notes, and a subprogram for accessing and updating an address book. The subprograms may be individual stand alone, separately compiled, programs activated by the phone application or subprograms resident within the phone application. The phone application and subprograms may be software compiled and then downloaded to the Palm™, compiled and resident in firmware, or lines of code downloaded and interpreted by another program executing on the Palm™ (e.g. Java type programs), or a combination of various program types. Similarly, memory device 320 may be a random access memory (RAM), read only memory (ROM), other memory device (firmware EPROM, etc.), or a combination of the various memory types.

The phone application and its subprograms are executed on processing unit 310. Display information from the programs, including the user interface (dialer screen for example), is sent to display mechanism 330 via a system bus 355. User selections and actions are retrieved via touch screen and/or hard button inputs as programmed by the phone application and sent to the phone application using standard Palm™ touch screen and hard button input mechanisms.

A telephone device 340 communicates with a network carrier to make telephone calls, including any of satellite, PCS, cellular, radio, landline (POTS), and other communication modes (cellular shown). Incoming call indications (including incoming call, caller ID, call status, etc.) are sent from the telephone device 340 to the phone application running on the processing unit via the system bus 355. Although a system and memory bus are shown, any mode of data communication between the various modules may be provided. The phone application initiates calls and directs call operations by sending commands to the telephone device (via the system bus, for example).

The configuration shown in FIG. 3 is for exemplary purposes for discussing the present invention. Many different combinations of processing units, programs, memory units, and telephone devices (modules) will be apparent to those skilled in the art to perform similar operations as required by the present invention. Therefore the present invention should not be limited by any particular hardware/software combination as many such combinations may be used to practice the invention as described herein.

Figure 4:
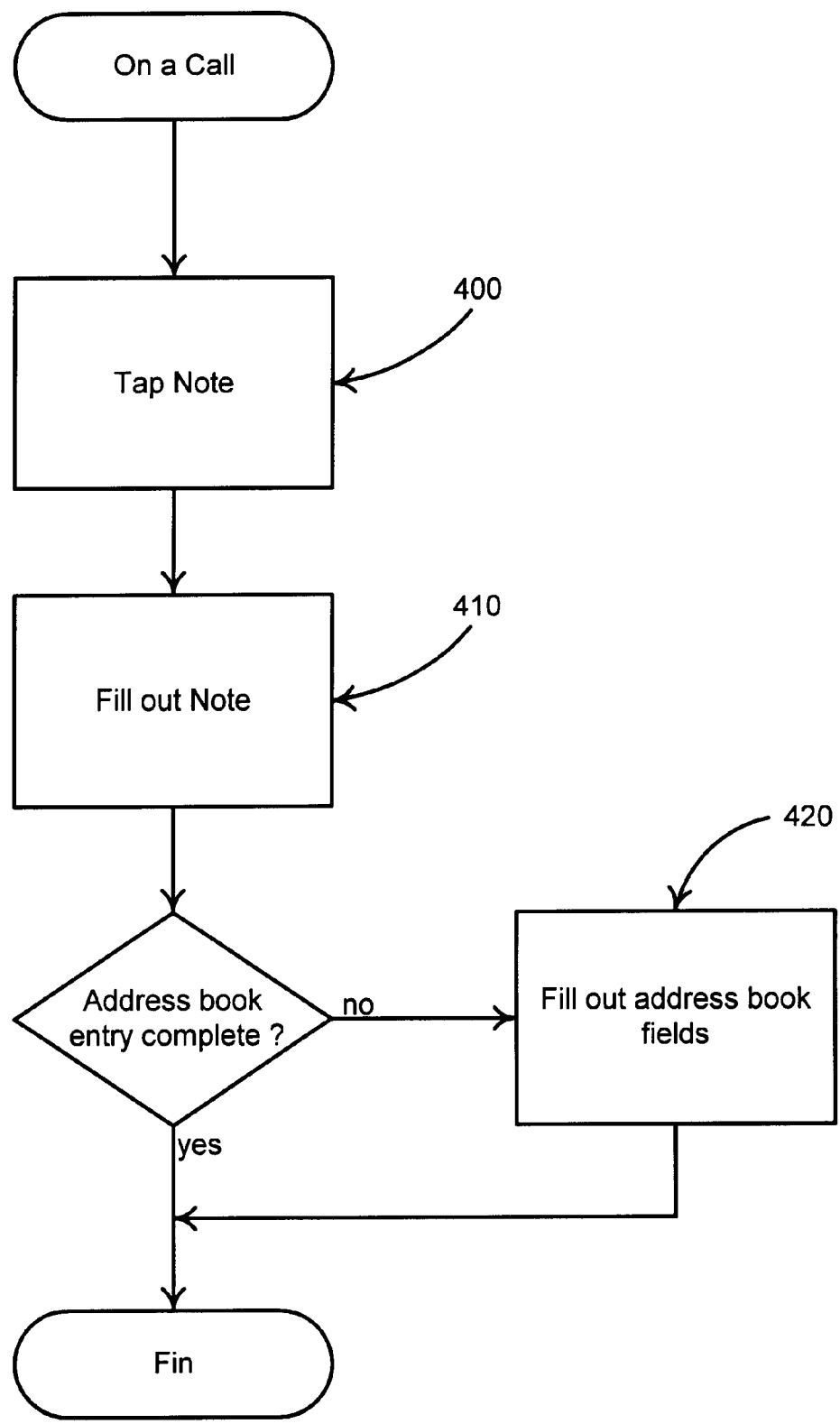
FIG. 4 is a flow chart illustrating user actions in creating a note according to one embodiment of the present invention.

FIG. 4 is a flow chart illustrating user actions in creating a note according to one embodiment of the present invention. While the user is on a call, if the user wishes to make a note, the user taps the note key 225 (step 400). Tapping is the preferred method of soft button selection on a touch sensitive screen used by the Palm™, however, any form of selecting the note key 225 may be utilized. For example, activating a specific sequence of keys from an attached keyboard (e.g. Alt+Ctl+Key), an attached pointing device (e.g. mouse), either of which may be attached via wire or wireless (e.g. IR), or a selection/pointing device integrated into the PDA.

After tapping the note key 225, the phone application boots a note entry program that allows the user to make notes regarding the phone call in which the user is currently engaged (step 410). Typically, the notes taken are any text entered into a Graffiti™ area 120 of the Palm™/PDA 200. However, any form for entering the note may be utilized (e.g., Graffiti™ area—stylus entry with character or script recognition, touch keyboard/keypad, an attached keyboard, or other data input methods for example). In one embodiment, if the caller (or person called) is identified, and a note has been previously created for that caller, rather than creating a entirely new note, the current note is appended to the previously created note.

Figure 5:
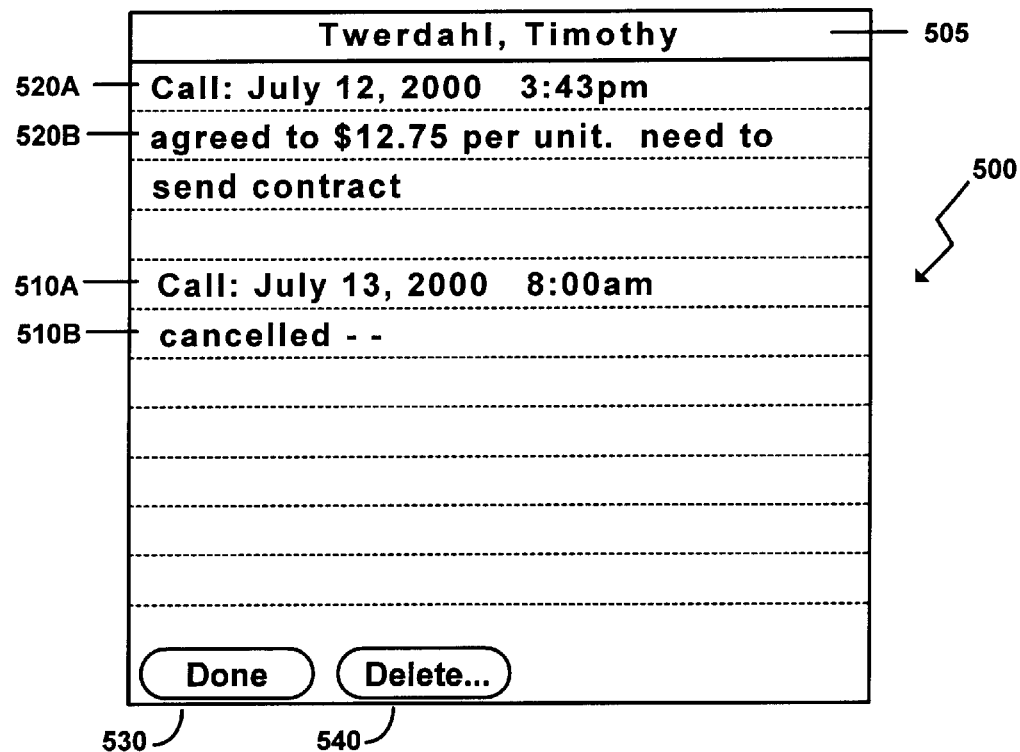
FIG. 5 is a screen shot of an embodiment of a note entry screen for an identified number with an address book entry according to the present invention.

FIG. 5 is a screen shot of an embodiment of a note entry screen 500 for an identified number with an address book entry. In this example, an identified caller "Timothy Twerdahl" has called on Jul. 13, 2000 at 8 AM, and the user has tapped the note key during the call. As can be seen in the figure, the note 500 is pre-populated with the name 505 of the caller (or called person), and a time stamp 510-A. The user notes are being entered in a note field 510-B. The time stamp 510-A indicates the time that the call was made, or, alternatively indicates the time that the note was initiated. In other embodiments, the time stamp includes a range of time, or a duration of the phone call, or time duration indicating the time it took the user to make the note.

In the example embodiment of FIG. 5, it is also seen that the user had previously created a note 520 (Jul. 12, 2000, 3:43 PM) with the same caller, as evidenced by the timestamp and note fields 520-A, and 520-B respectively. The cursor is blinking and ready for user inputs at the note filed 510-B. The current note (Jul. 13, 2000, 8:00 AM) is being appended to the Jul. 12, 2000 note.

When the note is completed, the user taps a Done key 530, and the display screen is changed to the previous dialer screen (see FIG. 2, for example), or, if an address book entry has not been completed for the caller, an address book entry screen is displayed so that the user can fill out.

A Delete key 540 is provided to delete the note(s). In one embodiment, one tap on the Delete key 540 deletes the entire note for that user (notes 510 and 520 in this example). Alternatively, each tap of the delete key deletes an individual note entry (first tap deleting note 510, and a second tap deleting note 520, or visa versa, for example). In one embodiment, if all note fields are deleted, the user is returned to the dialer screen. Alternatively a blank, pre-populated note remains on the note entry screen, ready for note field entry.

Figure 6:
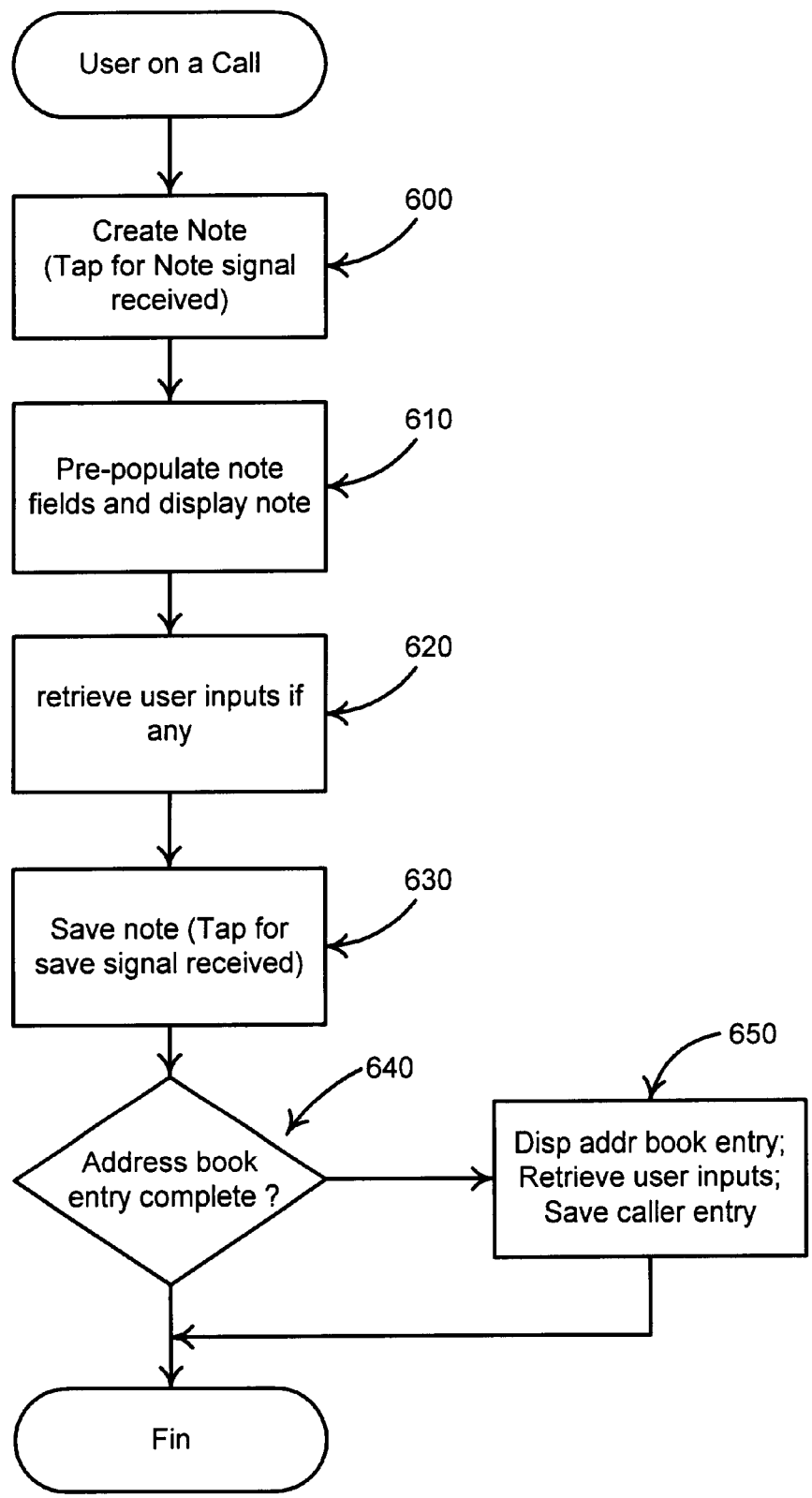
FIG. 6 is a flow chart of high level processes of one embodiment of selected parts of the phone application according to the present invention.

FIG. 6 is a flow chart of high level processes of one embodiment of selected parts of the note creating and address book portions of the phone application. A user on a call decides to take a note and taps the note key. A note tap signal is received by the phone application and the phone application starts the note entry program (step 600). The note entry program pre-populates fields in the note (e.g., name and timestamp, etc., other fields may also be pre-populated, day of the week, for example) and displays the note ready for user note entries (step 610). User inputs (note entries) are received via any of standard or program specific entry devices (attached keyboard, Graffiti™ area, etc.) (step 620). When the user taps the Done key, the note is saved (step 630). The note being saved may be saved locally in a non-volatile memory (non-volatile portion of memory device 325, for example), or, alternatively, the saved note may be transmitted to an attached or remote storage device, via a network (cellular for example), or other network connections.

An address book (stored in a portion of memory device 325, or at a remote location, for example) is checked to determine if an address book entry has been made (or completed) for the caller (step 640). If the address book entry has not been made, an address book entry is pre-populated with all information known about the caller (phone number, for example), and the user may then add information (name, address for example) (step 650). In one embodiment, if caller id information is available, the caller id information is used for pre-populating the address fields and/or the notes.

Figure 7:
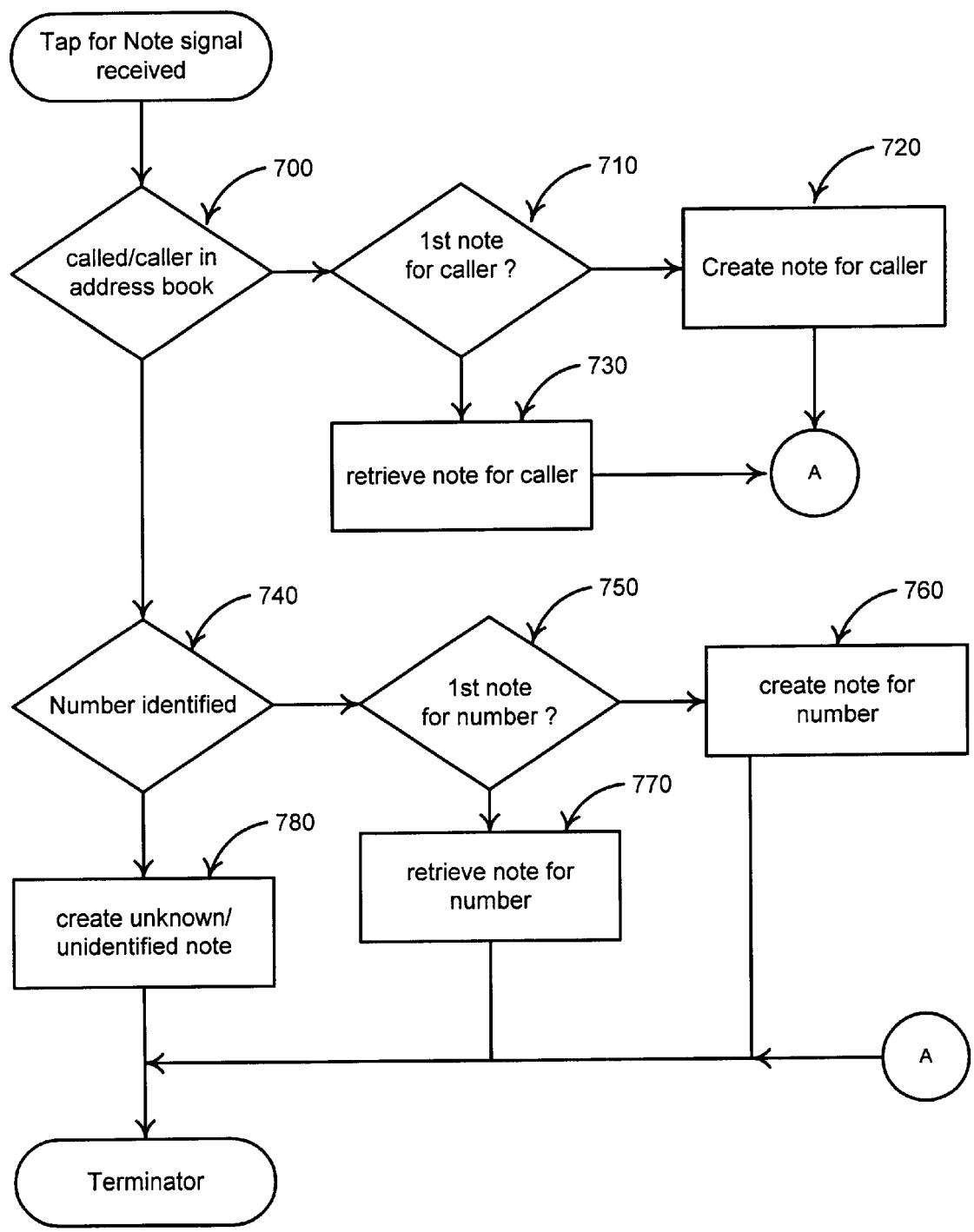
FIG. 7 is a flow chart of a create note process according to one embodiment of the present invention.

FIG. 7 is a flow chart of a create note process (see step 600) according to one embodiment of the present invention. At step 700, the number of caller/person called (or name if available) is checked to see if an address book entry has been made. If yes, it is determined if the current note will be the first note for that caller/called person (step 710). If the current note is the first note, a new note is created for the caller (step 720), otherwise, the previous note is retrieved so that the current note may be appended to it (step 730).

If the caller/called person is not in the address book, it is determined if the number is identified by the network (step 740). If the number is identified, it is determined if the current note will be the first note for the caller (step 750), in which case a note is created for the caller (step 760). If it is not the first note, the previous note is retrieved so that the current note may be appended to it (step 770). If the number is not identified by the network, an unknown/unidentified note is created (step 780).

Figure 8:
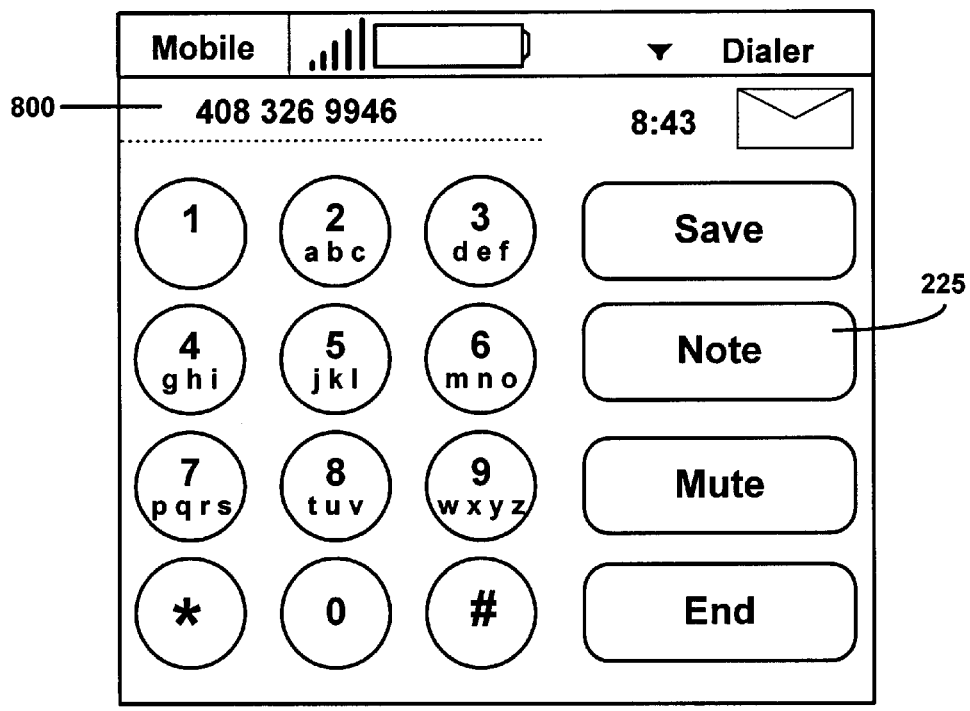
FIG. 8 is a screen shot of an embodiment of the phone application on a call to a number that is identified without an address book entry.

FIG. 8 is a screen shot of an example embodiment of the phone application on a call received from a number that is identified without an address book entry. The network identified number is entered on a call identification area 800 of the dialer screen. The screen shot of FIG. 8 is similar to a screen shot of a call made to someone not in the address book, i.e., the number will be shown in the call identification area (without a name). If the user taps on the Note key 225, the user is presented with a pre-populated note as illustrated in FIG. 9.

In FIG. 9, the note entry screen has the pre-populated time and date information 900-A, and a cursor position at the note field 900-B. Since the name of the caller/person called is not in the address book (or address list), an identifier, "-Unnamed-" is displayed as the name of the caller 905 at the top of the note. Other identifiers may be utilized to identify the call/caller as not having an address book entry. For example, any of -Unknown-, who ?, name unknown, unidentified, etc. may be used. In this example, since the name is not known but the phone number is identified, an alternative embodiment displays the identified phone number instead of "-Unnamed-."

Since no address book entry is available for the note in FIG. 9, when the user taps on Done 530 an address book entry screen is presented to the user (FIG. 10, for example). The address book entry screen has fields that allow the user to input data for the caller's name (First Name 1002, Last Name 1000), Title 1004, Company 1008, Work Number 1010, Home Number 1012, Fax Number 1014, Other 1016, E-mail 1018, and Address 1020. A name change arrow 1030 is available for changing a description of various fields in the address book. By tapping the name change, a drop down menu (not shown) appears having name options. For example, tapping name change arrow 1030 brings up a drop down menu with selectable options for a telephone number field (e.g., Work, Home, Office, Cell, etc). for the various items.

Fields of the address book entry screen are pre-populated with all the available information about the caller. FIG. 10 shows the work number being pre-populated with the callers number which had been identified by the network. If additional caller id data is available (name, for example), that additional data would also be pre-populated into corresponding fields in the address book entry screen. In one embodiment, if only a phone number is available, the decision to pre-populate that number in either a work or home phone may be made based on a time of day of the call (business hours=work phone, otherwise =home phone). The user may modify and add to any of the pre-populated fields as well as manually populate other fields. Any number of fields may be presented, the fields shown in FIG. 10 are examples, and any sub-set or super set of those fields may be presented. A scroll bar 1050 allows the user to scroll up or down to view additional address book fields. A Graffiti™ area shift key indicator 1055, which operates, for example, to configure handwriting recognition active in the Graffiti™ area 120 to recognize handwriting in upper case or lower case.

A category field 1040 activates a drop down menu that allows a user to select a category to which the address book entry belongs (e.g., personal, business, friends, etc.). A Note button 1060 is provided that allows the user to jump back to the note and modify or add to existing note data. A details button 1070 brings up a detailed screen where the user can set various preferences for the display of the address book entry, such as a phone number that shows up in a list of several phone numbers (for example, a phone book entry having multiple work phone numbers may have one of those multiple numbers set for display in the screen as shown in FIG. 10. And, a Done button 1080 closes the address book entry screen and saves (files) the entry in the address book (or address list).

Figure 11:
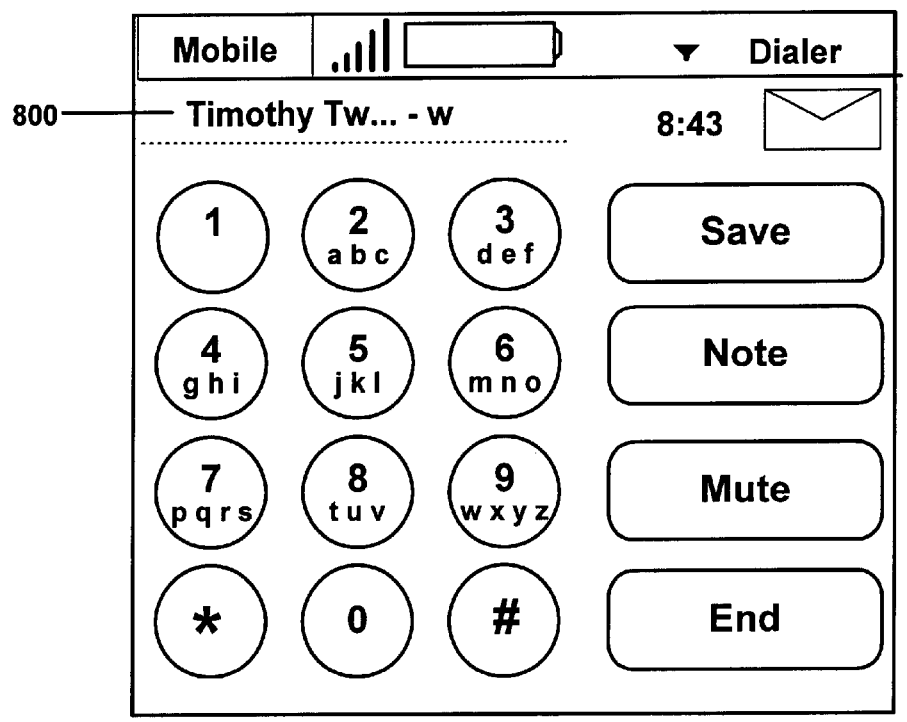
FIG. 11 is a screen shot of an embodiment of the phone application of present invention for an identified number after having an address book entry created.

When the address book entry screen closes, the user is returned to the dialer screen (see FIG. 11). The call identification area 800, instead of the caller's number, now contains the name entered in the address book (assuming the user entered the caller's name).

Figure 12:
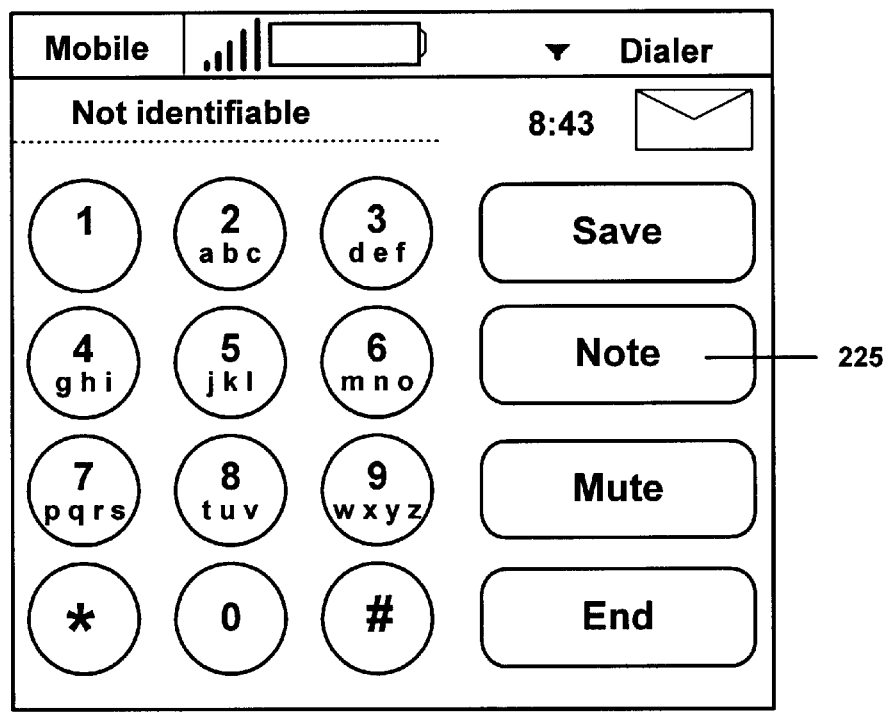
FIG. 12 is a screen shot of an embodiment of the phone application of present invention for a number that is not identified by the network communicating with the phone application.

Sometimes, a call is received where the network is unable to identify the number of the caller (the number is blocked or from an incompatible system, for example). In this case, the call identification area of the dialer screen identifies the number as "Not identifiable" (see FIG. 12, for example). Other nomenclature (unknown number, number blocked, etc., for example) or an icon (a phone with an "X" drawn across it, for example) may be used to notify the user.

When the network is unable to identify the number, and the user taps on the Note key 225, a note entry screen similar to that shown in FIG. 13 is presented. Since the name and number are not identified a message or other icon ("-Unnamed-" for example) is displayed at the top of the note entry screen 1305 notifying the user. A date and timestamp field 1310-A is prepopulated, and a note entry field 1310-B is ready for user note inputs. After entering the note and tapping done, the user is presented with the address book entry screen which allows the user to fill out an address book entry for the caller (see FIG. 14). Field similar to those show in FIG. 10 are presented, however, since no other information is available about the caller, none of the address book fields are pre-populated. In one embodiment, deleting the note (using delete key 540, for example) also brings up the address book entry screen.

The notes taken by the present invention may be maintained in storage, such as a database, and accessible via a note display and retrieval mechanism (database view and modify program, for example). In one embodiment, the notes are attached to the address book entries corresponding to the caller or person called. The notes may be saved along with the address book data, and/or pointers in address book entries can point to storage locations for specific notes related to those address book entries.

In one embodiment, if the user presses the note key while not in a call, a pre-populated note with information from a last call is presented to the user.

In one embodiment, while taking a note in a call, if the user wishes to end a phone call before completing the note (and therefore not given the opportunity to tap the End Key on the dialer screen), he user can use a phone hard button (240, for example) or a phone soft button (250, for example) adjacent to the Graffiti™ area. The location of any phone hard or soft buttons may be placed at any convenient location on a PDA or other device practicing the invention.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMS, EEPROMs, DRAMs, VRAMS, flash memory devices (including flash cards), magnetic or optical cards, nanosystems (including molecular memory Ics), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/ specialized computer or microprocessor are software modules for implementing the teachings of the present invention, including, but not limited to, identifying calls, presenting note and address book entry screens, collecting user inputs, updating address book entries, retrieving and saving notes, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. An electronic device, comprising:
   a phone application configured to allow a user to place and receive telephone calls;
   a note button; and
   a note device that operates upon activation of said note button;
   wherein:
   said note device is configured to,
   present a note entry screen to said user,
   pre-populate, without user input, note fields of said note entry screen with information known about a phone call in which said user is currently engaged, and
   take a note during a telephone call and
   said information comprises data based on caller-id information of the telephone call.

2. The electronic device according to claim 1, wherein said note button is accessible at least during telephone calls placed or received via said phone application.

3. The electronic device according to claim 1, wherein said information known about the phone call comprises caller-id information.

4. The electronic device according to claim 1, wherein said information known about the phone call comprises caller-id information that is placed in a note field that is selected by the note device based on a time of day in which the telephone call occurred.

5. The electronic device according to claim 3, wherein the selected note field is work phone when the phone call occurs during working hours and the selected note field is home phone when the phone call occurs during non-working hours.

6. The electronic device according to claim 1, wherein said pre-populated note fields include at least one of a telephone number field, a name field, a date field, a time stamp field, and a duration field.

7. The electronic device according to claim 1, wherein said note button is a physical hard button on said electronic device.

8. The electronic device according to claim 1, further comprising:
   a touch sensitive screen;
   wherein said note button is displayed on the touch sensitive screen.

9. The electronic device according to claim 8, wherein said note button is activated by anyone of a tap, tapping, touch, tap & hold, mouse click, tab & select, Alt+key, and other activation techniques.

10. The electronic device according to claim 1, wherein:
    said note device is further configured to recognize a current phone call having a previous note entry, and to associate the current note taken with the previous note entry.

11. The electronic device according to claim 10, wherein said current note taken is appended to the previous note entry.

12. The electronic device according to claim 1, further comprising:
    a display screen;
    wherein said phone application further comprises,
    a dialer device configured to display a dialing mechanism on said display screen for controlling telephone call operations, and
    said dialing mechanism comprises at least a telephone keypad, telephone operation control buttons, and a note button.

13. The electronic device according to claim 12, wherein said dialing mechanism includes an input that reconfigures the arrangement of keys and buttons of said dialing mechanism.

14. The electronic device according to claim 13, wherein said reconfiguration comprises swapping locations of the buttons and keypad between each of configurations preferred for right hand and left hand operations.

15. The electronic device according to claim 1, further comprising:
    a processor device;
    wherein said phone application and said note device are programs executed on said processor.

16. The electronic device according to claim 1, wherein:
    said note device is further configured to update an address book maintained on said electronic device, if an entry corresponding to the number of a received or dialed telephone call is not currently in the address book.

17. A method of operating a PDA, comprising the steps of:
    receiving a note signal from a user during a telephone call;
    opening a new note entry screen having at least one field for placement of data about said phone call, and a user modifiable note field;
    pre-populating at least one of said data fields with information regarding said telephone call; and
    displaying the new note entry screen;
    wherein:
    said information comprises data based on caller-id information about said phone call; and
    said step of pre-populating is performed only by the PDA just prior to displaying the note entry screen without user input.

18. The method according to claim 17, wherein said information comprises at least one of date, time, name, and telephone number.

19. The method according to claim 17, further comprising the steps of:
    checking for a telephone number of the caller or person called against an address book of said user; and
    pre-populating said data fields with any data found in an address book entry matching said telephone number.

20. The method according to claim 17, further comprising the step of:
    updating an address book based on information collected regarding said telephone call in an address book entry having a same telephone number as said telephone call.

21. The method according to claim 17, wherein said duration field is one of a duration of said telephone call and a duration of an amount of time required for the user to make a note.

22. A computer readable media having instructions stored thereon, said instructions, when loaded into and executed by a computer or processing device, perform the steps of:
    receiving a note signal;

opening a new note entry screen having, at least one field for placement of data about a telephone call placed or received by a user, and a user modifiable note field;

pre-populating at least one of said data fields with information regarding said telephone call; and displaying the new note entry screen;

wherein:

said information comprises data based on caller-id data of the telephone call.

23. The computer readable media according to claim 22, wherein said computer readable media is located on a Palm™ type PDA device having built in telephone capabilities configured to administer the telephone call.

24. The computer readable media according to claim 22, wherein said instructions, when loaded into and executed by a computer or processing device, further perform the steps of:

determining if there exists an address book entry corresponding to the telephone call in an address book maintained on a PDA executing the instructions stored on the computer readable media; and if the corresponding address book entry does not exist, then, creating an address book entry with data used in pre-populating the data fields of the note.

25. The computer readable media according to claim 22, wherein the data fields include a work phone, data field, and a home phone data field, one of which is pre-populated with the call-id data based on a time of the telephone call.

26. An electronic device comprising:

a phone application configured to allow a user to place and receive telephone calls;

a note button; and a note device that operates upon activation of said note button;

wherein:

said note device is further configured such that when the note button is pressed without a call in progress, a new note is created having a blank note area and at least one note field pre-populated by the note device with information regarding a last call of said phone application that has already terminated.

27. The electronic device according to claim 26, wherein said information is based on caller-id data of the already terminated last call.

* * * * *